United States Patent Office 3,736,228
Patented May 29, 1973

3,736,228
PROCESS FOR PRODUCING INOSINE
Kiyoshi Nakayama, Sagamihara, Akira Furuya, Kawasaki, and Fumio Kato, Tokyo, Japan, assignors to Kyowa Hakko Kogyo Co., Ltd., Tokyo, Japan
No Drawing. Filed Jan. 27, 1971, Ser. No. 110,280
Claims priority, application Japan, Feb. 5, 1970, 45/9,614
Int. Cl. C12d 13/06
U.S. Cl. 195—28 N      14 Claims

ABSTRACT OF THE DISCLOSURE

Inosine is produced by fermentation using an inosine-producing microorganism belonging to the genus Brevibacterium, preferably *Brevibacterium ammoniagenes*. The strains employed have the characteristic that their system for the biosynthesis of 5'-inosinic acid undergoes no feedback inhibition and/or repression.

---

This invention relates to a process for producing inosine. More particularly, it relates to a process for the production of inosine by fermentation. Even more particularly, the invention relates to a process for producing inosine by fermentation with microorganisms belonging to the genus Brevibacterium.

Inosine (hypoxanthine riboside) is important as an intermediate raw material for producing 5'-inosinic acid (inosine-5'-phosphoric acid), which is widely used as a chemical seasoning agent. Furthermore, inosine has been regarded recently as an important medicine, because it has an excellent therapeutic effect upon conditions of serious heart disease, liver disease or abnormal cell metabolism such as leukopenia, etc.

Accordingly, one of the objects of the present invention is to provide a process for the production of inosine which overcomes the disadvantages and deficiencies of the prior art methods.

Another object of the present invention is to provide a process for producing inosine by fermentation which may be carried out in an efficacious and relatively simple manner.

A further object of the invention is to provide a process for producing inosine by fermentation which may be carried out advantageously on an industrial scale at low cost to give a high yield of product.

A still further object of the invention is to provide inosine.

These and other objects and advantages of the present invention will become apparent to those skilled in the art from a consideration of the following specification and claims.

In accordance with the present invention, the inventors have found the phenomenon that microorganisms belonging to the genus Brevibacterium, whose system for the biosynthesis of 5'-inosinic acid (which is regarded as a precursor for the biosynthesis of inosine) undergoes no feedback inhibition and/or repression, are capable of accumulating remarkable amounts of inosine in a culture medium and in the microbial cells. The production of inosine in this manner can be carried out readily in a suitable aqueous nutrient medium using inexpensive starting raw materials.

It is widely recognized that the system for the biosynthesis of 5'-inosinic acid, which as noted above is regarded as a precursor for inosine, undergoes feedback inhibition and repression by various purine nucleotides or their related materials [Haruo Momose: Protein, Nucleic Acid and Enzyme (Japan), vol. 13, p. 781 (1968)]. In fact, it is generally recognized that, when an excess amount of adenine or guanine or the like is added to a nutrient medium during the accumulation of 5'-inosinic acid by means of microorganisms, the accumulation is considerably inhibited. As explained above, the inosine-producing microorganisms used in the present invention are characterized in that the system for the biosynthesis of 5'-inosinic acid is not subject to such a feedback inhibition and/or repression. The microorganisms employed in this invention can be derived by various mutation procedures, for example, using ultraviolet rays, X-rays, γ-rays, various chemical treatments, etc. Furthermore, it is possible to select these microorganisms at a high frequency after the mutation treatment from microorganisms growing on an agar medium containing purine-analogous compounds (for example, 6-mercaptopurine, 6-mercaptoguanine, 6-methylmercaptopurine, 8-azaadenine, 8-azaguanine, 8-azaxanthine, 2-fluoroadenine 2-bromoadenine, etc.).

The particular characteristic of the microorganisms used in the present invention, that is, the feature that the system for the biosynthesis of 5'-inosinic acid undergoes no feedback inhibition and/or repression, is illustrated in more detail in Tables 1 and 2. In these experiments, after a chemical treatment with N-methyl-N'-nitro-N-nitrosoguanidine, *Brevibacterium ammoniagenes* ATCC 6872 (parent strain) was smeared onto a medium containing 6-mercaptoguanine, and *Brevibacterium ammoniagenes* No. 41001 ATCC 21477, the strain selected from those which had grown, was used. Table 1 shows that the phosphoribosylpyrophosphate amidotransferase (the enzyme number 2.4.2.14), which is an initial enzyme of the system for the biosynthesis of 5'-inosinic acid and a leading enzyme of the feedback inhibition phenomenon, undergoes no inhibition action by the nucleotide of the purine type. Table 2 shows that the enzyme formation is not repressed by the purine bases.

TABLE 1

| Inhibitory agent | Concentration | Degree of inhibition of enzyme activity, percent | |
|---|---|---|---|
| | | ATCC 6872 | Strain 41001, ATCC 21477 |
| Adenosine-5'-monophosphate | $10^{-2}$M | 95 | 0 |
| Adenosine-5'-triphosphate | $10^{-2}$M | 100 | 0 |
| Guanosine-5'-monophosphate | $10^{-2}$M | 100 | 0 |

TABLE 2

| Repressive agent | Concentration (ml./l.) | Degree of repression of enzyme formation, percent | |
|---|---|---|---|
| | | ATCC 6872 | Strain 41001, ATCC 21477 |
| Adenine | 500 | 80 | 0 |
| Guanine | 500 | 75 | 0 |

Accordingly, and in summary, the microorganisms used in the present invention have the characteristics of belonging to the genus Brevibacterium, undergoing no feedback inhibition and/or repression in the system for the biosynthesis of 5'-inosinic acid, and producing and accumulating inosine in high yield. Particular nutrient-requiring strains which have these characteristics and require amino acids, vitamins, organic bases or the like for their growth can, of course, also be employed in the present invention. In fact, it is clearly illustrated in Examples 3 and 4 hereinbelow that the microorganisms, whose system for the biosynthesis of 5'-inosinic acid undergoes no feedback inhibition and/or repression and which require either adenine or guanine or both at the same time for their growth, have a remarkable ability for producing inosine in high yield.

Either a synthetic culture medium or a natural nutrient medium is suitable for the cultivation of the strains employed in the present invention as long as it contains the essential nutrients for the growth of the microorganism strain employed. Such nutrients are well known in the art and include substances such as a carbon source, a nitrogen source, inorganic compounds, trace amounts of necessary nutrients and the like which are utilized by the microorganism employed in appropriate amounts.

Thus, as a carbon source, there may be mentioned, by way of example, carbohydrates such as glucose, fructose, sucrose, maltose, mannose, mannitol, galactose, ribose, glycerol, starch, starch hydrolyzate liquor, molasses, etc., or any other suitable carbon source such as organic acids, for example, acetic acid, lactic acid, pyruvic acid, gluconic acid, etc., or amino acids, for example, glycine, glutamic acid, alanine, glutamine, asparagine, etc. These substances may be used either singly or in mixtures of two or more. A hydrocarbon or a mixture of hydrocarbons may be employed in the nutrient medium as the main source of carbon in the case of using hydrocarbon-assimilating microorganism strains. Such hydrocarbons include normal paraffins (alkanes) having from 5 to 18 carbon atoms, such as n-pentane, n-octane, n-decane, n-dodecane, n-hexadecane, etc., branched chain paraffins such as isopentane, isooctane, etc., cycloparaffins such as cyclohexane and cyclooctane, straight and branched-chain olefins such as pentene-2, hexene-1, octene-1, octene-2, etc., cycloolefins such as cyclohexene, aromatic hydrocarbons such as benzene, o-xylene, p-xylene, etc., and mixtures thereof and mixed hydrocarbons such as kerosene, light oils, heavy oils, paraffin oils, etc., i.e., various petroleum fractions, including petroleum crudes. A carbohydrate or other suitable carbon source may be used in the fermentation medium along with the hydrocarbon, if desired.

As a nitrogen source, various kinds of inorganic or organic salts or compounds, such as urea, ammonia or ammonium salts such as ammonium chloride, ammonium sulfate, ammonium nitrate, ammonium acetate, ammonium phosphate, ammonium carbonate, etc., or natural substances containing nitrogen, such as cornsteep liquor, yeast extract, meat extract, peptone, fish meal, bouillon, casein hydrolysates, fish solubles, NZ-Amine (a series of casein hydrolysates), defatted soybean cake, digested products such as digested fish meal or digested defatted soybean cake, chrysalis hydrolysate, etc. or substances such as glycine, glutamic acid, alanine, etc. may be employed. Again, these substances may be used either singly or in mixtures of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

In the case of strains that require a trace amount of nutrients such as vitamins, amino acids, organic bases or the like for their growth, these substances are, of course, added to the nutrient medium, unless these nutrients are already contained within the components present in the medium, whereby it is not necessary to specifically add these nutrients to the medium in addition thereto. Such nutrients include, for example, purine bases such as adenine, guanine, etc., and/or vitamins such as biotin, thiamine, cobalamin and the like.

The fermentation or culturing of the microorganisms is conducted under aerobic conditions, such as aerobic shaking of the culture or with stirring and aeration of a submerged culture, at a temperature of, for example, about 20° to 40° C. and at a pH of, for example, about 4.0 to 9.0. It is desirable to keep the pH of the medium at around neutral (7.0) during the cultivation with aqueous ammonia, urea solution, sodium hydroxide or the like in order to obtain a high yield of product, but these particular conditions of temperature and pH are not essential in carrying out the process of the present invention. After about two to seven days of culturing under these conditions, considerable amounts of inosine are found to be accumulated in the resultant culture liquor and in the microbial cells.

After the completion of culturing, the inosine is recovered from the resultant culture liquor or broth by conventional means, such as ion exchange resin treatment, extraction with solvents, precipitation, adsorption, chromatography or the like. A preferred procedure is by means of an ion exchange resin treatment as shown in Example 1 below.

The following examples are given merely as illustrative of the present invention and are not to be considered as limiting. Unless otherwise noted, the percentages therein and throughout the application are by weight per liter of water.

EXAMPLE 1

*Brevibacterium ammoniagenes* No. 41001 ATCC 21477 is used as the seed microorganism strain. This strain is cultured in a medium containing 2% glucose, 1% peptone, 1% meat extract, 1.0% yeast extract and 0.3% sodium chloride at 30° C. for 24 hours. One liter of a fermentation medium having the following composition is prepared:

| | |
|---|---|
| Glucose | g-- 150 |
| Monopotassium phosphate | g-- 10 |
| Dipotassium phosphate | g-- 10 |
| Magnesium sulfate | g-- 10 |
| Calcium chloride | g-- 1.0 |
| Iron sulfate | mg-- 10 |
| Zinc sulfate | mg-- 1 |
| Manganese sulfate | mg-- 10 |
| Vitamin $B_1$ | mg-- 5 |
| Calcium pantoethenate | mg-- 10 |
| Cystine | mg-- 20 |
| Biotin | µg-- 30 |
| Meat extract | g-- 10 |
| Urea (sterilized separately) | g-- 2 |

After adjusting the pH of the fermentation medium to 7.8, three liters of the medium is placed into a 5-liter jar fermentor and heated at 120° C. for 30 minutes to effect sterilization. Then, 300 ml. of the resultant seed culture liquor is inoculated therein. Culturing is carried out for four days, while adjusting the pH to 6.8 with aqueous ammonia. As a result, 35.4 mg./ml. of inosine is accumulated in the resultant culture liquor.

One liter of a filtrate obtained by filtering the microbial cells and precipitates from the fermentation liquor is passed through a column of the ion exchange resin Dowex 50 ($NH_4$-form) together with one liter of an extract liquor obtained by extracting the cells and precipitates with hot water. The inosine is adsorbed by the resin. The resin column is washed with water and eluted with a 0.01 N ammonium hydroxide solution. The inosine-containing fractions are collected and concentrated under a reduced pressure and cooled, giving 18.4 grams of crude crystals of inosine. All of the tests carried out thereon, including elementary analysis, content analysis of each base and sugar, ultra-violet absorption diagrams and Rf values of the paper chromatographs of the recrystallized substance, indicate and prove that the substrate thus obtained is, in fact, inosine.

EXAMPLE 2

*Brevibacterium ammoniagenes* No. 41002 ATCC 21478 is employed as the seed strain. This strain is obtained by ultraviolet rays irradiation on *Brevibacterium ammoniagenes* ATCC 6872. The mutant strain ATCC 21478 also has the property whereby its system for the biosynthesis of 5'-inosinic acid undergoes no feedback inhibition and repression. Culturing is carried out in the same manner as described in Example 1, except that 200 g./l. as glucose of a starch hydrolyzate is used in place of the glucose. After culturing for 110 hours, 43.5 mg./ml. of inosine is found to be accumulated in the resultant culture liquor.

EXAMPLE 3

*Brevibacterium ammoniagenes* No. 41011 ATCC 21479, derived from *Brevibacterium ammoniagenes* ATCC 21477 by additional ultraviolet irradiation, is employed as the seed strain. This strain is a nutrient-requiring strain which requires adenine for its growth. Culturing is carried out in the same manner as described in Example 1, except that 300 mg./l. of adenine and 100 mg./l. of hypoxanthine are added to the fermentation medium and, furthermore, 5% of glucose is fed to the fermentation medium after 48 hours from the beginning of the cultivation. A 20% urea solution is used for the pH adjustment of the culture liquor. After culturing has been continued for 120 hours, 45.5 mg./ml. of inosine is found to be accumulated in the resultant culture liquor.

EXAMPLE 4

A nutrient-requiring strain of *Brevibacterium ammoniagenes*, strain No. 41021 ATCC 21480, is employed as the seed strain. This strain is derived from *Brevibacterium ammoniagenes* ATCC 21478, described in Example 2 above, by a chemical treatment thereof with ethylmethane sulfonate. *Brevibacterium ammoniagenes* ATCC 21480 requires adenine and guanine for its growth.

A fermentation medium having the following composition is prepared in one liter of water:

| | |
|---|---|
| (As glucose) acid-hydrolyzate waste molasses percent | 15 |
| Dipotassium phosphate g | 2.0 |
| Vitamin B$_1$ mg | 5 |
| β-alanine mg | 10 |
| Urea (sterilized separately) g | 6.0 |
| Sodium glutamate g | 5.0 |
| Peptone g | 2.0 |
| Adenine mg | 300 |
| Guanine mg | 200 |

The pH of the fermentation medium is adjusted to 7.4. Following the same culturing procedure as described in Example 1, 10% (as glucose) acid-hydroylzate waste molasses is fed to the fermentation medium after 48 hours from the beginning of the cultivation. The pH of the medium is adjusted to 6.4 with aqueous ammonia. After culturing has been conducted for 120 hours, 52.4 mg./ml. of inosine is found to be accumulated in the resultant culture liquor.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A process for producing inosine which comprises culturing an inosine-producing microorganism belonging to the species *Brevibacterium ammoniagenes*, said microorganism having the characteristic that its system for the biosynthesis of 5′-inosinic acid at least undergoes no feed-back inhibition and/or repression, under aerobic conditions, in an aqueous nutrient medium, and accumulating inosine in the resultant culture liquor and microbial cells.

2. The process of claim 1, wherein culturing is carried out at a temperature of about 20° to 40° C. and at a pH of about 4.0 to 9.0.

3. The process of claim 1, wherein said microorganism requires adenine or guanine or both adenine and guanine for its growth.

4. The process of claim 1, wherein said microorganism is *Brevibacterium ammoniagenes* ATCC 21477.

5. The process of claim 1, wherein said microorganism is *Brevibacterium ammoniagenes* ATCC 21478.

6. The process of claim 1, wherein said microorganism is *Brevibacterium ammoniagenes* ATCC 21479.

7. The process of claim 1, wherein said microorganism is *Brevibacterium ammoniagenes* ATCC 21480.

8. The process of claim 1, wherein the pH of the nutrient medium is maintained at around 7 during the culturing.

9. A process for producing inosine which comprises culturing an inosine-producing microorganism belonging to *Brevibacterium ammoniagenes*, said microorganism having the characteristic that its system for the biosynthesis of 5′-inosinic acid at least undergoes no feed-back inhibition and/or repression, under aerobic conditions in an aqueous nutrient medium at a temperature of about 20° to 40° C. and at a pH of about 4.0 to 9.0, accumulating inosine in the resultant culture liquor, and recovering the inosine from the culture liquor.

10. The process of claim 9, wherein said microorganism is *Brevibacterium ammoniagenes* ATCC 21477.

11. The process of claim 9, wherein said microorganism is *Brevibacterium ammoniagenes* ATCC 21478.

12. The process of claim 9, wherein said microorganism is *Brevibacterium ammoniagenes* ATCC 21479.

13. The process of claim 9, wherein said microorganism is *Brevibacterium ammoniagenes* ATCC 21480.

14. The process of claim 9, wherein the pH of the nutrient medium is maintained at around 7 during the culturing.

References Cited
UNITED STATES PATENTS 3,616,212  10/1971  Abe et al. _____ 195—28 N
3,620,922  11/1971  Abe et al. _____ 195—28 N ALVIN E. TANENHOLTZ, Primary Examiner U.S. Cl. X.R.
195—112